US007935160B2

(12) United States Patent
Holzmann et al.

(10) Patent No.: US 7,935,160 B2
(45) Date of Patent: May 3, 2011

(54) FILTER ASSEMBLY WITH TRAPPED CONTAMINANT SERVICING

(75) Inventors: Mark V. Holzmann, Stoughton, WI (US); Kaarthik Venkataraman, Stoughton, WI (US); Jim L. Alonzo, Verona, WI (US); Robert A. Bannister, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 84 days.

(21) Appl. No.: 12/474,374

(22) Filed: May 29, 2009

(65) Prior Publication Data

US 2010/0300298 A1 Dec. 2, 2010

(51) Int. Cl.
*B01D 50/00* (2006.01)

(52) U.S. Cl. ................ 55/337; 55/528; 55/522; 55/429; 55/432; 55/482

(58) Field of Classification Search .................... 55/528, 55/522, 429, 432, 337, 482
See application file for complete search history.

(56) References Cited

U.S. PATENT DOCUMENTS

| | | | | |
|---|---|---|---|---|
| 4,162,906 | A | 7/1979 | Sullivan et al. | |
| 4,276,070 | A * | 6/1981 | Hug | 55/429 |
| 4,704,144 | A * | 11/1987 | LeBlanc et al. | 55/300 |
| 5,882,367 | A | 3/1999 | Morgan et al. | |
| 6,183,544 | B1 | 2/2001 | Ormond et al. | |
| 6,317,920 | B1 * | 11/2001 | Brickner et al. | 15/334 |
| 6,383,244 | B1 * | 5/2002 | Wake et al. | 55/482 |
| 6,835,221 | B2 * | 12/2004 | Rikyuu et al. | 55/315 |
| 6,966,940 | B2 * | 11/2005 | Krisko et al. | 55/497 |
| 7,662,199 | B2 * | 2/2010 | Wellens et al. | 55/337 |

OTHER PUBLICATIONS

Air Cleaner Extensions, Diesel Progress Show, http://shows.dieselpub.com/dpshow_2008, website visited Dec. 14, 2008.

* cited by examiner

*Primary Examiner* — Jason M Greene
*Assistant Examiner* — Dung Bui
(74) *Attorney, Agent, or Firm* — Andrus, Sceales, Starke & Sawall, LLP; J. Bruce Schelkopf

(57) ABSTRACT

A filter assembly has a housing removably receiving a contaminant tray, with a filter element mounted to the contaminant tray and removable therewith from the housing for servicing. The filter element traps contaminant in the contaminant tray including when the contaminant tray is removed from the housing, to prevent spillage of contaminant during servicing.

29 Claims, 7 Drawing Sheets

FILTER ASSEMBLY WITH TRAPPED CONTAMINANT SERVICING

BACKGROUND AND SUMMARY

The invention relates to filter assemblies, and servicing thereof.

Filter assemblies typically require servicing to remove and clean or replace a filter element. During servicing, including while the filter element is removed, it is desirable to prevent the contaminant, e.g. dust or other contaminant, which had been blocked by the filter element, from entering the system and adversely affecting downstream components.

The present invention arose during continuing development efforts directed toward filter assemblies, including trapping contaminant upon removal of a filter element from a filter housing, to prevent spillage of the contaminant during servicing.

DETAILED DESCRIPTION

Figure 1:
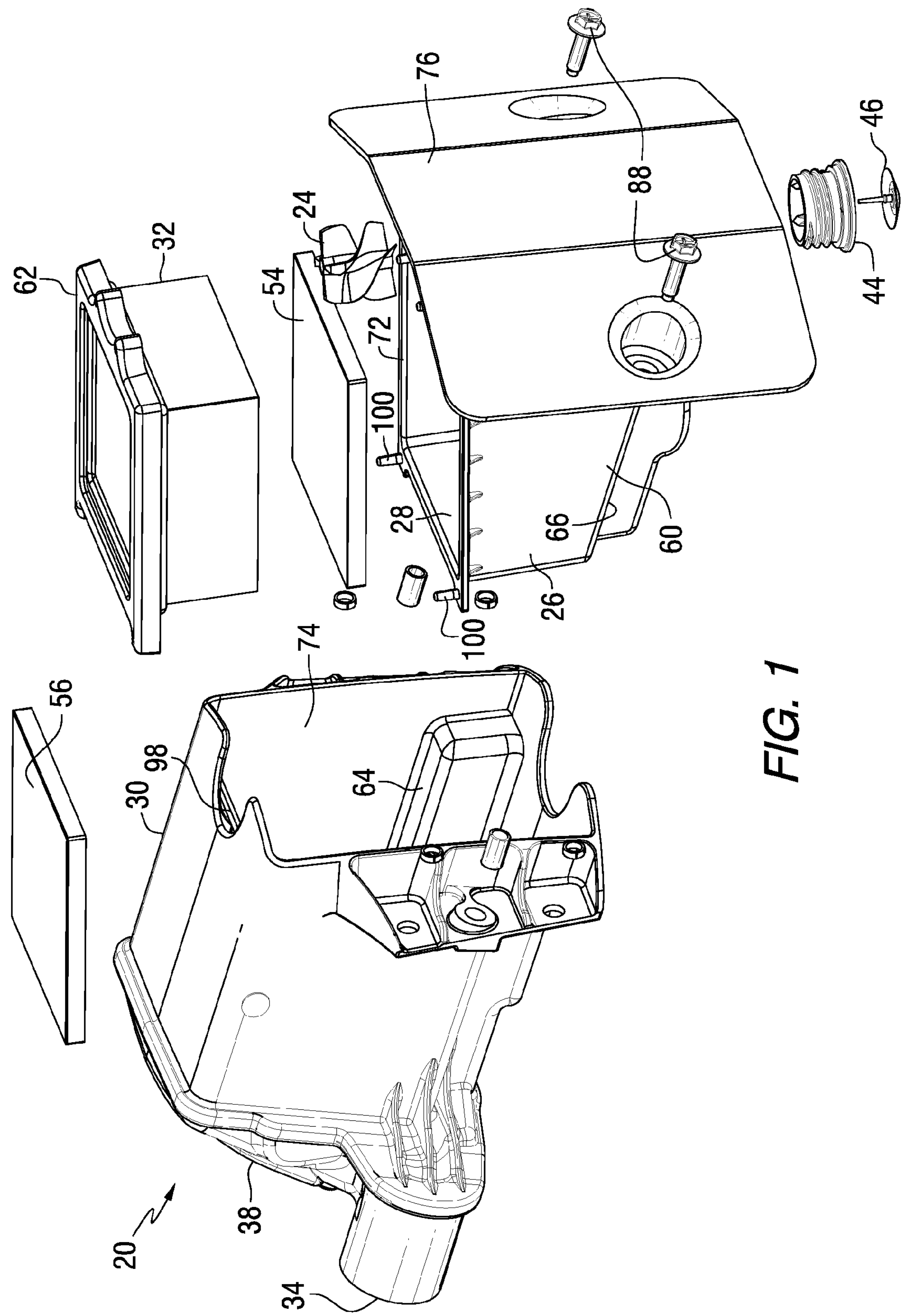
FIG. 1 is an exploded perspective view of a filter assembly in accordance with the invention.
Figure 2:
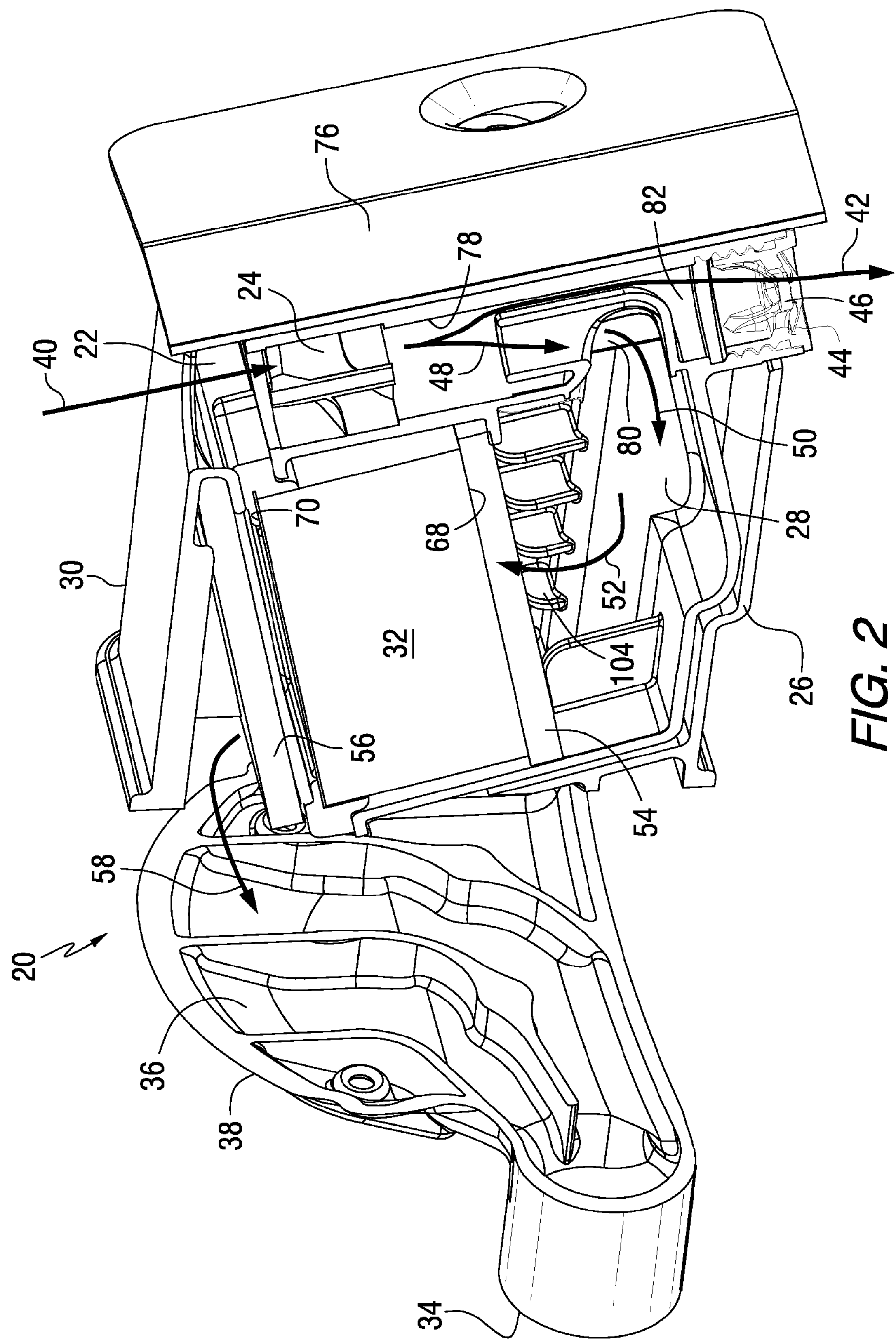
FIG. 2 is further exploded view of the assembly of FIG. 1.
Figure 3:
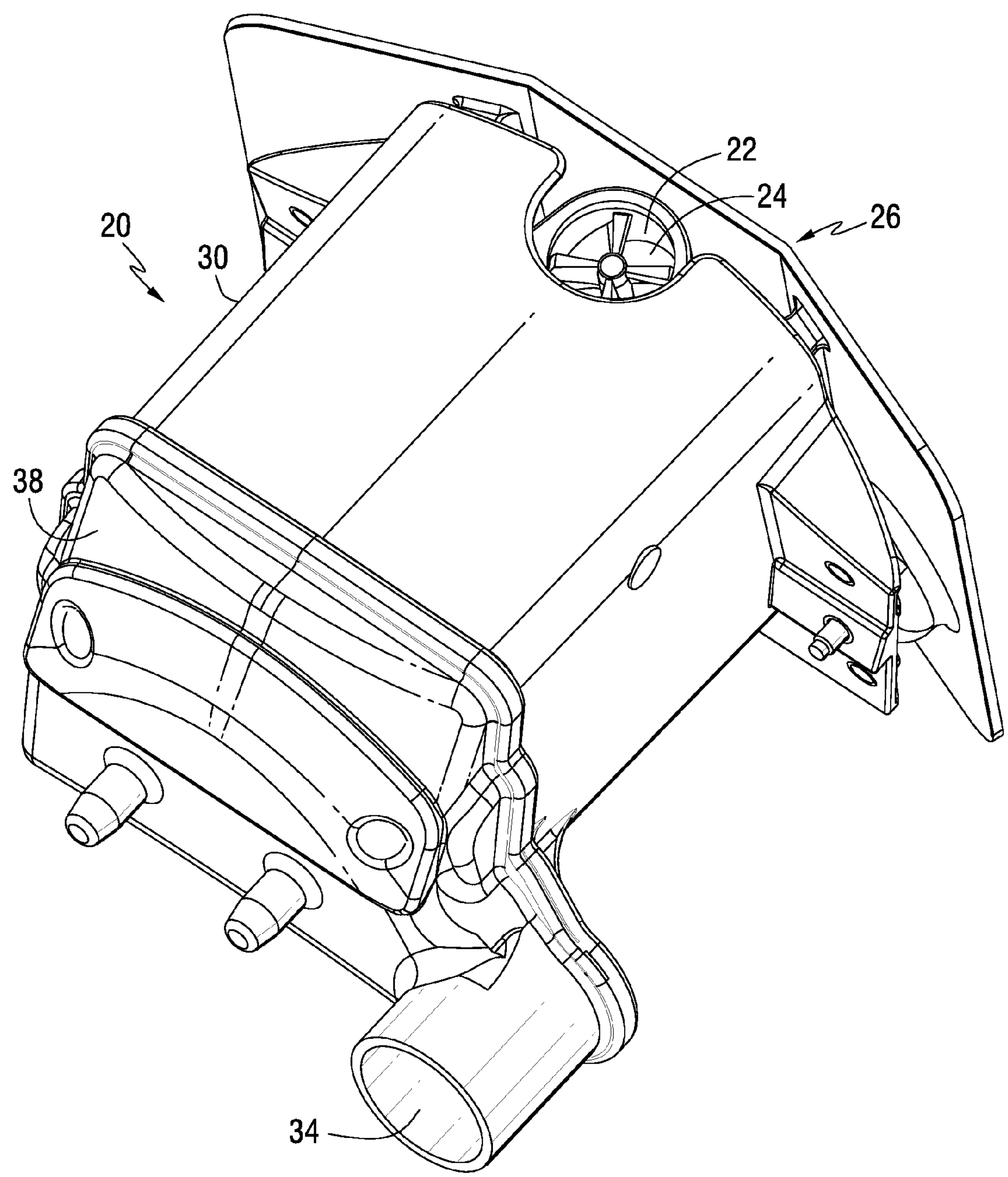
FIG. 3 is a perspective assembly view of the filter assembly of FIGS. 1,2.
Figure 4:
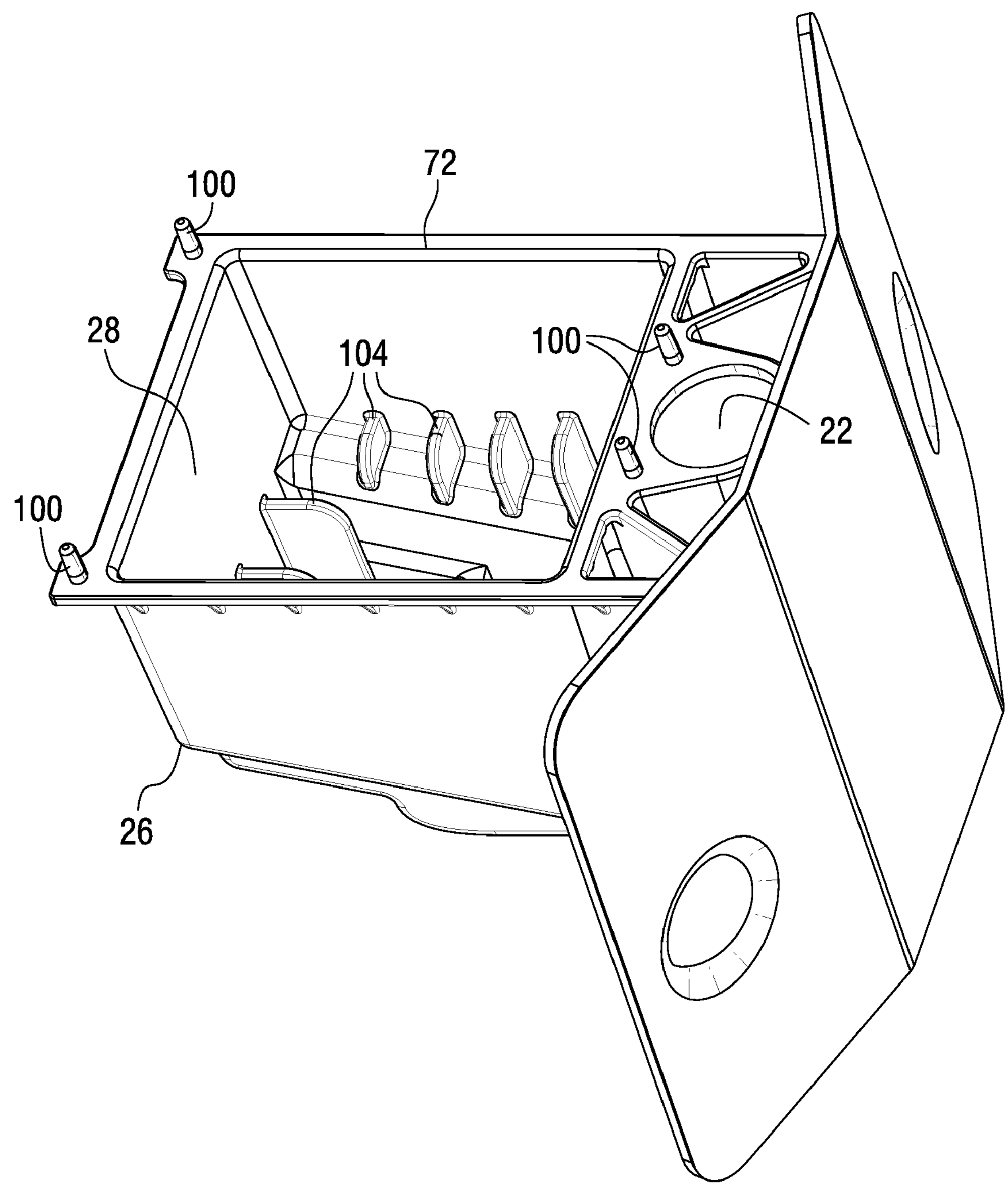
FIG. 4 is a perspective view of a component of FIG. 1.

FIG. 1 shows a filter assembly 20 having an inlet 22, FIGS. 2, 3, for receiving fluid containing contaminant, e.g. combustion intake air for an internal combustion engine, wherein the air contains dust, or other fluid containing contaminant. A pre-cleaner 24 preferably removes at least some of the contaminant, e.g. at least some dust. In one embodiment, the pre-cleaner is a cyclonic pre-cleaner with one or more vanes. Cyclonic pre-cleaners with vanes are known in the prior art. The assembly is provided with a contaminant tray 26 having a collection plenum 28, FIGS. 1, 2, 4, collecting at least some of the contaminant removed by the pre-cleaner. A housing 30 removably receives contaminant tray 26. A filter element 32 is mounted to contaminant tray 26 and is removable therewith from housing 30 for servicing. The filter element may be mounted to the tray by simply resting therein or thereon or by mechanical attachment or affixment thereto or otherwise assembled therewith, to be described. Filter element 32 traps contaminant in contaminant tray 26 including when the contaminant tray is removed from the housing, FIG. 5, whereby to prevent spillage of the contaminant during servicing. Housing 30 has an outlet 34 receiving fluid flow after passage through filter element 32 and through outlet plenum 36 at outlet end portion 38 of the housing. Outlet 34 discharges clean filtered fluid.

Fluid flows from upstream to downstream through filter assembly 20 from inlet 22 to outlet 34. This is illustrated at inlet or entry arrow 40, FIG. 2, whereafter the fluid flows through pre-cleaner 24, whereafter some of the separated contaminant flows as shown at arrow 42 to pre-cleaner outlet 44 which may have a dust or contaminant ejection valve 46 as shown in commonly owned co-pending U.S. patent application Ser. No. 12/402,857, filed Mar. 12, 2009, incorporated herein by reference. The remaining fluid flow and separated contaminant from pre-cleaner 24 flows as shown at arrow 48 axially downwardly in FIG. 2 and then laterally leftwardly as shown at arrow 50 into collection plenum 28. The fluid then flows upwardly as shown at arrow 52 preferably through a pre-filter 54 then through main filter element 32 then preferably through a secondary or safety filter 56 and then flows axially upwardly and turns laterally leftwardly as shown at arrow 58 into outlet plenum 36 and then to housing outlet 34. Collection plenum 28 in contaminant tray 26 is gravitationally below filter element 32 and upstream of filter element 32.

Contaminant tray 26 is provided by a drawer 60 laterally slidable into and out of housing 30 between closed and open positions, respectively. Filter element 32 has a perimeteral sealing gasket 62, FIGS. 5-8, engaged and compressed in sealing relation between drawer 60 and housing 30 in the noted closed position. Housing 30 and drawer 60 have mating guide tracks 64 and 66, respectively, FIG. 1, guiding the drawer during lateral sliding (leftwardly in FIG. 1) into the housing to the noted closed position. At least one of the guide tracks extends at an angle along a wedge shape relative to the perimeteral plane of perimeteral sealing gasket 62 to compress the gasket as the drawer is slid into the housing to the closed position. The direction of compression of perimeteral sealing gasket 62 is normal to the noted perimeteral plane.

Fluid flows axially upwardly through filter element 32 along an axial flow direction (upwardly in FIGS. 1, 2) from a lower face 68 to an upper face 70. Lower face 68 is an upstream face. Upper face 70 is a downstream face. Lower face 68 faces downwardly toward collection plenum 28. Upper face 70 has the noted perimeteral sealing gasket 62 therearound and extending laterally therebeyond. Contaminant tray 26 is open-topped, FIG. 4, and has an upper lip 72 at which perimeteral sealing gasket 62 is disposed, FIG. 5, and suspends filter element 32 in contaminant tray 26. Housing 30 has a pocket 74, FIG. 1, receiving drawer 60 in the noted closed position. Drawer 60 has an outer face 76 facing laterally away from pocket 74. Inlet 22 directs fluid flow axially downwardly, arrow 40, FIG. 2, and through pre-cleaner 24 and along an axial path, which axial path at 40 is laterally between outer face 76 of drawer 60 and perimeteral sealing gasket 62. Drawer 60 has an axial passage 78, FIG. 2, therethrough defining the noted axial flow path. Axial passage 78 has an upper upstream end receiving fluid from inlet 22, and has first and second lower downstream ends 80 and 82. Lower downstream end 80 communicates with collection plenum 28 and filter element 32. Lower downstream end 82 has the noted ejection valve 46 ejecting contaminant from pre-cleaner 24. In one embodiment, the noted axial path is provided through an inlet tube 84, FIG. 5, laterally adjacent perimeteral sealing gasket 62, which gasket has a profiled surface 86 laterally facing and complementally configured to inlet tube 84 in keyed relation to provide one-way-only fit of filter element 32 in drawer 60, including perimeteral sealing gasket 62 at upper lip 72 of the drawer. Drawer 60 is mounted to and held in its closed position in housing 30 by screws such as 88, which screws 88 are removed to enable lateral sliding of the drawer out of pocket 74 of the housing for servicing.

In one embodiment, filters 54 and 56 are omitted. In another embodiment, filter 56 is eliminated and filter 54 is included, to provide a three stage filter assembly having a first stage provided by pre-cleaner 24, a second stage provided by filter media 54 downstream of pre-cleaner 24 and upstream of filter element 32, and a third stage provided by filter element 32. In another embodiment, filter 54 is omitted and filter 56 is included, to provide a three stage filter assembly having a first stage provided by pre-cleaner 24, a second stage provided by filter element 32 downstream of pre-cleaner 24, and a third stage provided by filter media 56 downstream of filter element 32. In another embodiment, both filters 54 and 56 are included, to provide a four stage filter assembly having a first stage provided by pre-cleaner 24, a second stage provided by filter media 54 downstream of pre-cleaner 24 and upstream of filter element 32, a third stage provided by filter element 32, and a fourth stage provided by filter media 56 downstream of filter element 32. In a further embodiment, pre-cleaner 24 is omitted.

Figure 5:
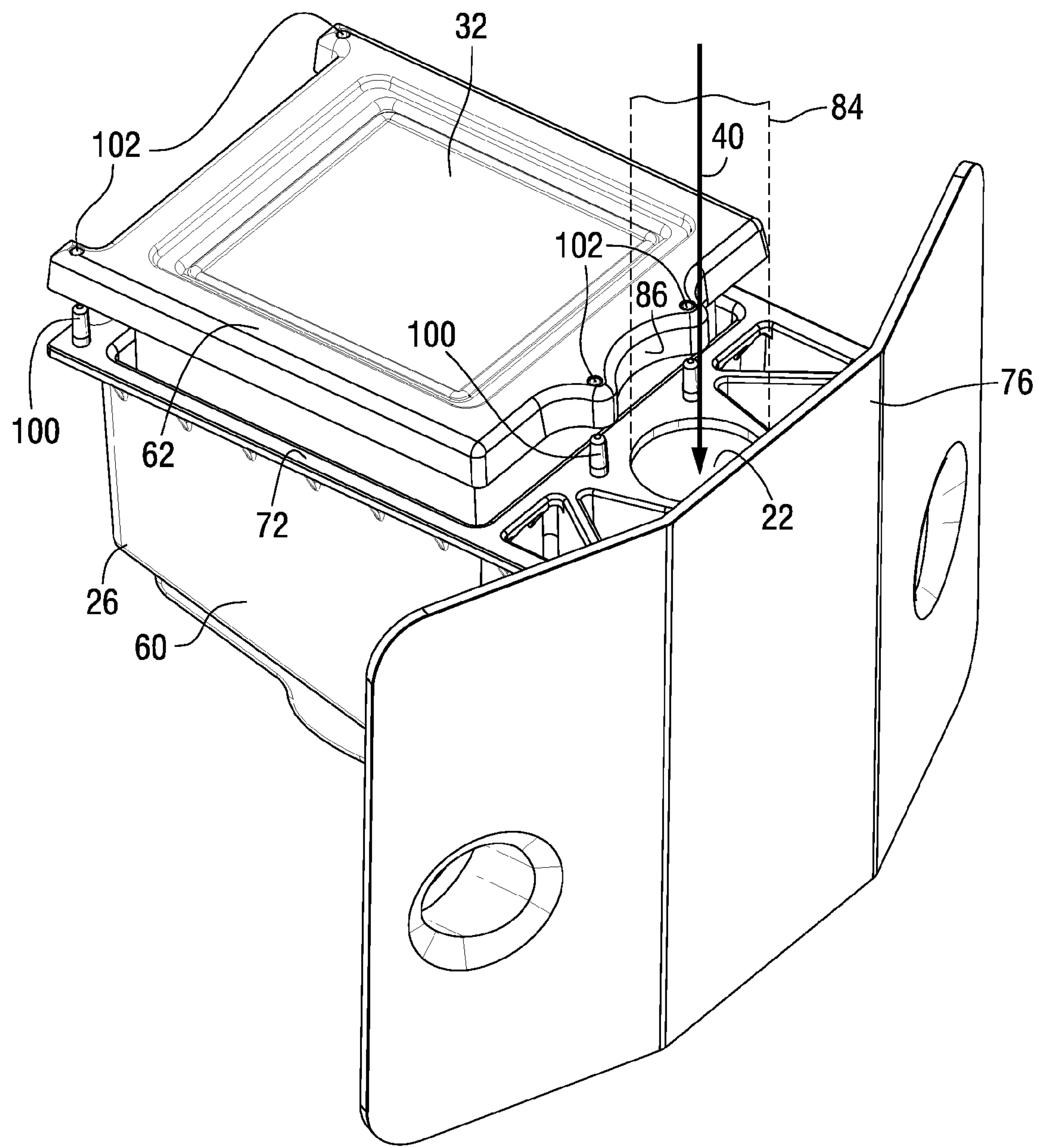
FIG. 5 is a perspective assembly view of selected components of FIG. 1.
Figure 6:
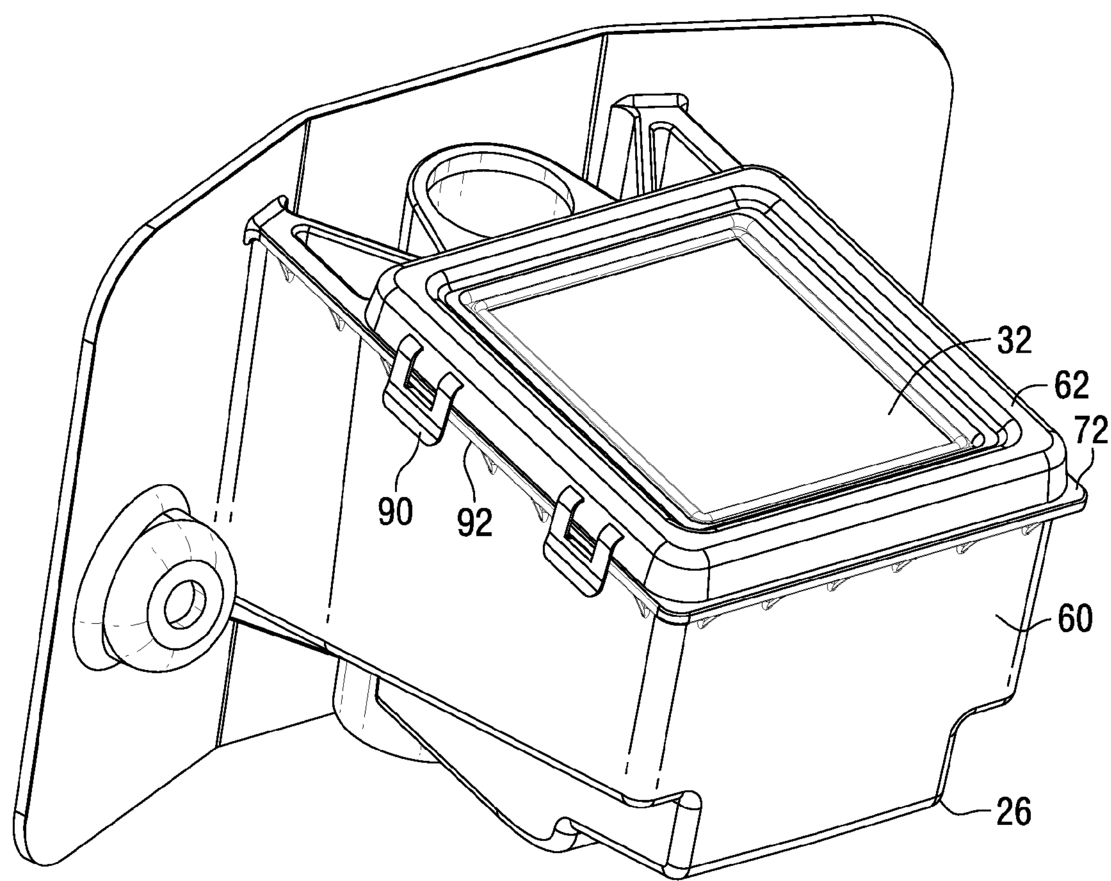
FIG. 6 is a perspective assembly view of selected components of FIG. 1 and showing a further embodiment.
Figure 7:
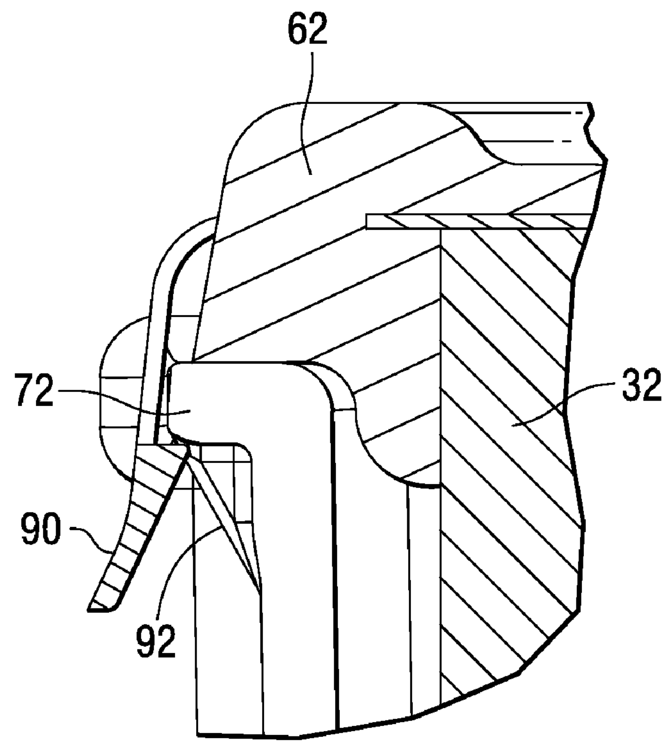
FIG. 7 is a sectional view of a portion of FIG. 6.
Figure 8:
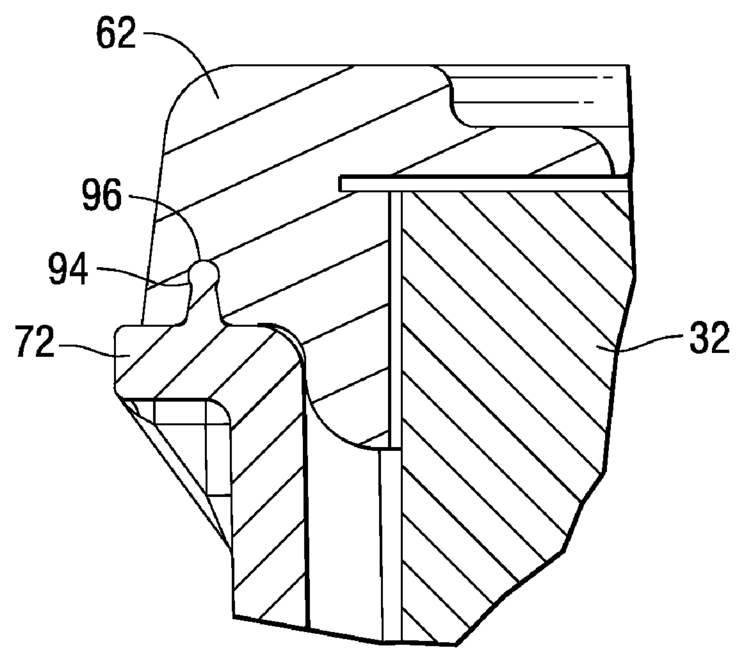
FIG. 8 is like FIG. 7 and shows another embodiment

In one embodiment, filter element 32 has the noted perimeteral sealing gasket 62 mounted to drawer 60 at upper lip 72 to suspend filter element 32 in drawer 60 and define collection plenum 28 in a space below filter element 32. In one embodiment, perimeteral sealing gasket 62 is snap-fit mounted to drawer 60 at upper lip 72 by one or more snap-fit tabs 90 and mating slots 92, FIGS. 6, 7. In another embodiment, perimeteral sealing gasket 62 is mounted to drawer 60 in interference fit detent relation, e.g. a finger 94, FIG. 8, extending upwardly from upper lip 72 of the drawer into a groove or cavity 96 in the gasket. In another example releasably mounting the sealing gasket to the drawer in interference fit detent relation, one or more posts such as 100, FIGS. 1, 4, 5 extend upwardly from lip 72 and are received in mating bores such as 102 in gasket 62. The mounting assemblies such as shown at 90, 92, 94, 96, 100, 102 are optional, and instead sealing gasket 62 may simply rest on lip 72. In a further embodiment, the filter element at gasket 62 may simply be press-fit or wedged into the drawer along the inner perimeter of the drawer. The drawer may be provided with upstanding ribs such as 104 extending upwardly from the bottom of the drawer to space the filter element above the collection plenum at the bottom of drawer 62. The noted axial path at 40, FIG. 5, is provided through the noted axial inlet tube 84 extending into drawer 60. Housing 30 has a guide surface 98, FIG. 1, laterally facing axial inlet tube 84 and cooperating with the tube to guide lateral insertion of drawer 60 into pocket 74 in housing 30 for installation alignment.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter assembly comprising an inlet for receiving fluid containing contaminant, a pre-cleaner removing at least some of said contaminant, a contaminant tray having a collection plenum collecting at least some of said contaminant removed by said pre-cleaner, a housing removably receiving said contaminant tray, a filter element mounted to said contaminant tray and removable therewith from said housing for servicing, said filter element trapping said contaminant in said contaminant tray including when said contaminant tray is removed from said housing, whereby to prevent spillage of said contaminant during said servicing, said housing having an outlet receiving fluid flow after passage through said filter element, said outlet discharging clean filtered fluid, wherein said filter element defines an inlet plenum and an outlet plenum on respective first and second distally opposite sides thereof, said inlet plenum is in said contaminant tray, said outlet plenum is in said housing, said inlet plenum communicates with said inlet and receives said fluid containing contaminant, said outlet plenum communicates with said outlet and discharges said clean filtered fluid thereto, said collection plenum is provided by said inlet plenum.

2. The filter assembly according to claim 1 wherein said fluid flows from upstream to downstream through said filter assembly from said inlet to said outlet, said collection plenum in said contaminant tray is gravitationally below said filter element and upstream of said filter element, and said contaminant tray comprises a drawer laterally slidable into and out of said housing between closed and open positions, respectively.

3. The filter assembly according to claim 1 wherein said contaminant tray comprises a drawer laterally slidable into and out of said housing between closed and open positions, respectively, said filter element has a perimeteral sealing gasket engaged and compressed in sealing relation between said drawer and said housing in said closed position.

4. The filter assembly according to claim 3 wherein said housing and said drawer have mating guide tracks guiding said drawer during said lateral sliding into said housing to said closed position, at least one of said guide tracks extending at an angle along a wedge shape relative to the perimeteral plane of said perimeteral sealing gasket to compress said perimeteral sealing gasket as said drawer is slid into said housing to said closed position, the direction of compression of said perimeteral sealing gasket being normal to said perimeteral plane.

5. The filter assembly according to claim 1 wherein the fluid flows axially upwardly through said filter element along an axial flow direction from a lower face to an upper face, said lower face being an upstream face, said upper face being a downstream face, said lower face facing downwardly toward said collection plenum.

6. The filter assembly according to claim 5 wherein said upper face has a perimeteral sealing gasket therearound and extending laterally therebeyond, said contaminant tray being open-topped and having an upper lip at which said perimeteral sealing gasket is disposed and suspends said filter element in said contaminant tray.

7. The filter assembly according to claim 1 wherein said contaminant tray comprises a drawer laterally slidable into and out of said housing between closed and open positions, respectively, said housing has a pocket receiving said drawer in said closed position, said drawer has an outer face facing laterally away from said pocket, said inlet directs fluid flow axially downwardly and through said pre-cleaner and along an axial path, said filter element has a perimeteral sealing gasket engaged and compressed in sealing relation between said drawer and said housing in said closed position, said axial path being laterally between said outer face of said drawer and said perimeteral sealing gasket.

8. The filter assembly according to claim 7 wherein said drawer has an axial passage therethrough defining said axial path, said axial passage having an upper upstream end receiving fluid from said inlet, and having first and second lower downstream ends, said first lower downstream end communicating with said collection plenum and said filter element, said second lower downstream end having an ejection valve ejecting contaminant from said pre-cleaner.

9. The filter assembly according to claim 7 wherein said axial path is provided through an inlet tube laterally adjacent said perimeteral sealing gasket, and said perimeteral sealing gasket has a profiled surface laterally facing and complementally configured to said inlet tube in keyed relation to provide one-way-only fit of said filter element in said drawer, including said perimeteral sealing gasket at an upper lip of said drawer.

10. The filter assembly according to claim 1 wherein said pre-cleaner comprises a cyclonic pre-cleaner with one or more vanes.

11. The filter assembly according to claim 1 wherein said fluid flows from upstream to downstream through said filter assembly from said inlet to said outlet, and said filter assembly comprises a three stage filter assembly comprising a first stage provided by said pre-cleaner, a second stage provided by filter media downstream of said pre-cleaner and upstream of said filter element, and a third stage provided by said filter element.

12. The filter assembly according to claim 1 wherein said fluid flows from upstream to downstream through said filter assembly from said inlet to said outlet, and said filter assembly comprises a three stage filter assembly comprising a first stage provided by said pre-cleaner, a second stage provided by said filter element downstream of said pre-cleaner, and a third stage provided by filter media downstream of said filter element.

13. The filter assembly according to claim 1 wherein said fluid flows from upstream to downstream through said filter assembly from said inlet to said outlet, and said filter assembly comprises a four stage filter assembly comprising a first stage provided by pre-cleaner, a second stage provided by first filter media downstream of said pre-cleaner and upstream of said filter element, a third stage provided by said filter element, and a fourth stage provided by second filter media downstream of said filter element.

14. The filter assembly according to claim 1 wherein said contaminant tray comprises an open-topped drawer, and said filter element has a perimeteral sealing gasket therearound mounted to said drawer.

15. The filter assembly according to claim 14 wherein said drawer has an upper lip, and said perimeteral sealing gasket is mounted to said drawer at said upper lip to suspend said filter element in said drawer and define said collection plenum in a space below said filter element in said drawer.

16. The filter assembly according to claim 15 wherein said perimeteral sealing gasket is snap-fit mounted to said drawer at said upper lip by one or more snap-fit tabs and mating slots.

17. The filter assembly according to claim 15 wherein said perimeteral sealing gasket is mounted to said drawer in interference fit detent relation.

18. The filter assembly according to claim 7 wherein said axial path is provided through an axial inlet tube extending into said drawer.

19. The filter assembly according to claim 18 wherein said housing has a guide surface laterally facing said axial inlet tube and cooperating with said axial inlet tube to guide lateral insertion of said drawer into said housing for installation alignment.

20. The filter assembly according to claim 1 wherein said contaminant tray comprises a drawer laterally slidable into and out of said housing between closed and open positions, respectively, said housing has a pocket receiving said drawer in said closed position, said drawer has an outer face facing laterally away from said pocket.

21. The filter assembly according to claim 1 wherein said contaminant tray comprises a drawer laterally slidable into and out of said housing between closed an open positions, respectively, said housing has a pocket receiving said drawer in said closed position, said drawer has an outer face facing laterally away from said pocket, said inlet includes an axial inlet tube extending into said drawer, said housing at said pocket has a guide surface laterally facing said axial inlet tube and cooperating with said axial inlet tube to guide lateral insertion of said drawer into said pocket in said housing for installation alignment.

22. A filter assembly comprising an inlet for receiving fluid containing contaminant, a contaminant tray having a collection plenum for collecting contaminant, a housing removably receiving said contaminant tray, a filter element mounted to said contaminant tray in sealing relation and removable therewith from said housing for servicing, said filter element trapping said contaminant in said contaminant tray including when said contaminant tray is removed from said housing, whereby to prevent spillage of said contaminant during said servicing, said housing having an outlet receiving fluid flow after passage through said filter element, said outlet discharging clean filtered fluid, wherein said filter element defines an inlet plenum and an outlet plenum on respective first and second distally opposite sides thereof, said inlet plenum is in said contaminant tray, said outlet plenum is in said housing, said inlet plenum communicates with said inlet and receives said fluid containing contaminant, said outlet plenum communicates with said outlet and discharges said clean filtered fluid thereto, said collection plenum is provided by said inlet plenum.

23. The filter assembly according to claim 22 wherein said contaminant tray comprises a drawer laterally slidable into and out of said housing between closed and open positions, said fluid flows from upstream to downstream through said filter assembly from said inlet to said outlet, and said collection plenum in said contaminant tray is gravitationally below said filter element and upstream of said filter element.

24. The filter assembly according to claim 23 wherein said filter element is mounted to said contaminant tray in said sealing relation by a perimeteral sealing gasket compressed between said drawer and said housing in said closed position, wherein said housing and said drawer have mating guide tracks guiding said drawer during said lateral sliding into said housing to said closed position, at least one of said guide tracks extending at an angle along a wedge shape relative to the perimeteral plane of said perimeteral sealing gasket to compress said perimeteral sealing gasket as said drawer is slid into said housing to said closed position, the direction of compression of said perimeteral sealing gasket being normal to said perimeteral plane.

25. The filter assembly according to claim 22 wherein the fluid flows axially upwardly through said filter element along an axial flow direction from a lower face to an upper face, said lower face being an upstream face, said upper face being a downstream face, said lower face facing downwardly toward said collection plenum, said upper face having a perimeteral sealing gasket therearound and extending laterally therebeyond, said contaminant tray being open-topped and having an upper lip at which said perimeteral sealing gasket is disposed and suspends said filter element in said contaminant tray.

26. The filter assembly according to claim 22 wherein said contaminant tray comprises an open-topped drawer, and said filter element has a perimeteral sealing gasket therearound mounted to said drawer.

27. The filter assembly according to claim 26 wherein said drawer has an upper lip, and said perimeteral sealing gasket is mounted to said drawer at said upper lip to suspend said filter element in said drawer and define said collection plenum in a space below said filter element in said drawer.

28. The filter assembly according to claim 27 wherein said perimeteral sealing gasket is snap-fit mounted to said drawer at said upper lip by one or more snap-fit tabs and mating slots.

29. The filter assembly according to claim 27 wherein said perimeteral sealing gasket is mounted to said drawer in interference fit detent relation.

* * * * *